Patented May 30, 1933

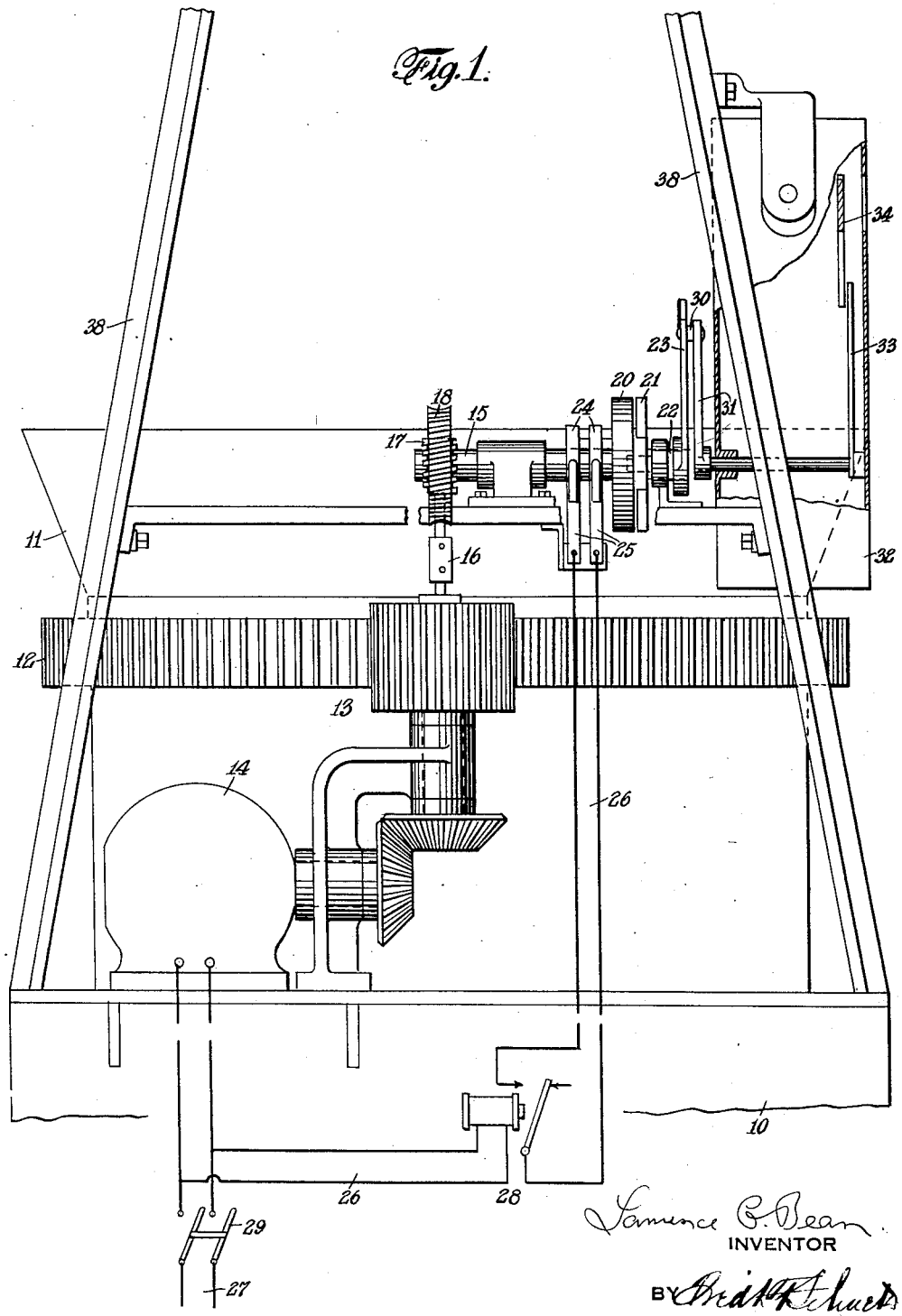

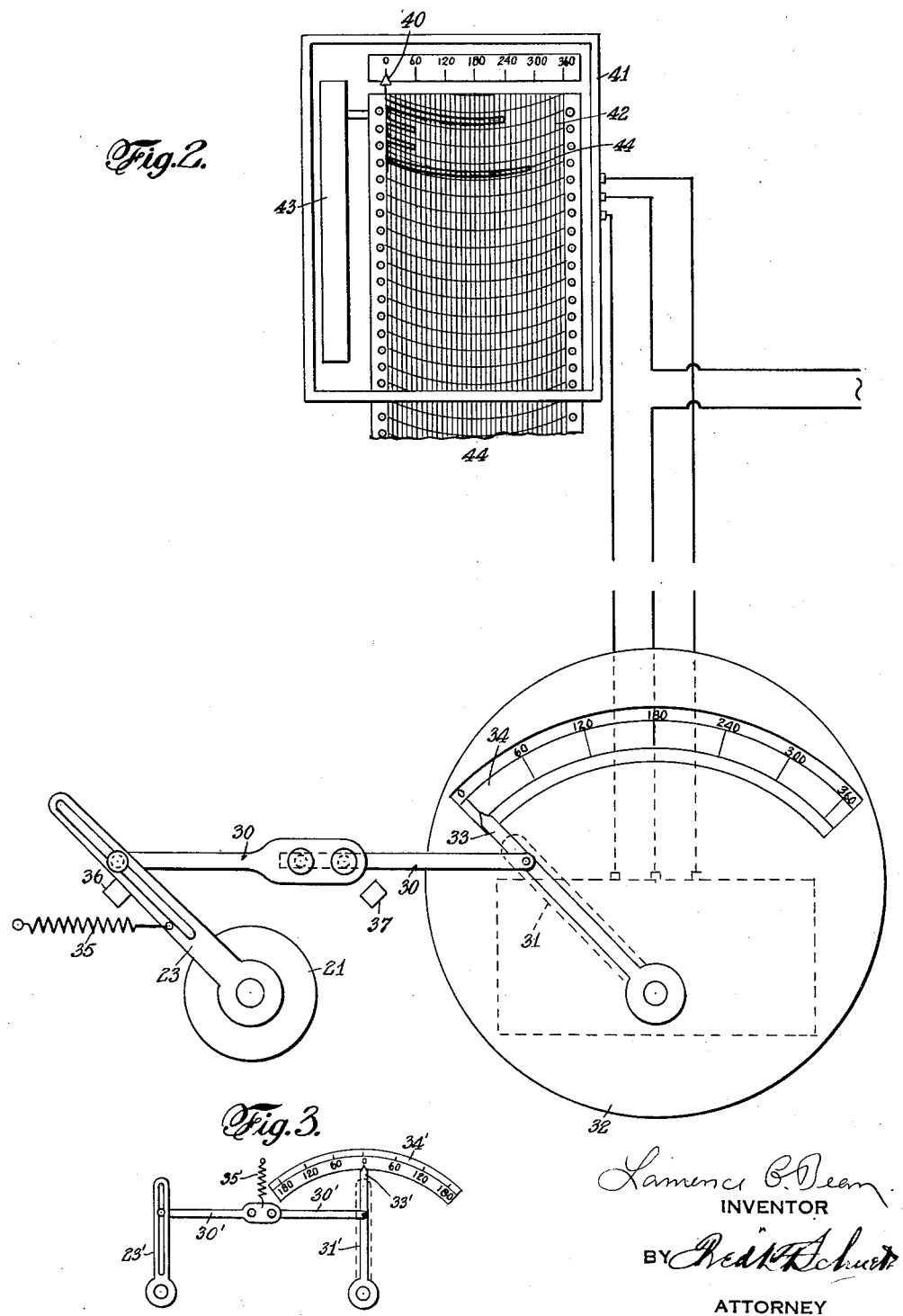

1,911,740

UNITED STATES PATENT OFFICE

LAURENCE G. BEAN, OF WATERBURY, CONNECTICUT, ASSIGNOR TO THE BRISTOL COMPANY, OF WATERBURY, CONNECTICUT, A CORPORATION OF CONNECTICUT

MEASURING INSTRUMENT FOR THE MOTION OF ROTARY DISTRIBUTING TOPS

Application filed December 18, 1930. Serial No. 503,170.

The invention relates to measuring apparatus for indicating and/or recording the angular motion of a rotary charging top such as is utilized in distributing material, for example, in the operation of a blast furnace. In apparatus of this nature, the ore, coke and other ingredients are deposited by a skip hoist into a bell or hopper which, after it has received the load of material, rotates a certain angular distance to deposit each load or any part of a load, or any combination of loads, at predetermined points about the vertical axis of the furnace for the purpose of avoiding uneven loading of the latter.

It is an object of the present invention to afford means whereby the extent of angular movement of the bell or hopper may be indicated and/or recorded at the furnace or like apparatus, or at a point remote therefrom, or both.

A further object of the invention resides in the provision of a time or delayed opening relay to allow for accommodating any coasting action of the rotatable top.

The invention has for a still further object an arrangement of the measuring mechanism which will insure against damage to such mechanism in the event of the top overrunning; and to afford measuring mechanism which will automatically return to a zero or base position when the rotation of the top ceases.

The nature of the invention, however, will best be understood when described in connection with the accompanying drawings, in which:

Fig. 1 is a fragmentary elevation of a rotary top of a furnace, and the associated mechanism for affording the measurement of its angular movement.

Fig. 2 is a fragmentary side view of a portion of the said associated mechanism, together with a plan view of a remote recording apparatus and its transmitting circuit.

Fig. 3 is a fragmentary view illustrating a modification in the measuring mechanism.

Referring to the drawings, 10 designates the top of an apparatus to which material is to be supplied in manner well understood, for example, the top 10 may be that of a blast furnace into which ore, coke or other ingredients are deposited through the usual rotary hopper 11 to be delivered thereby at different points to secure the desired loading of the furnace. No claim is made to the rotatable hopper nor to the manner of driving the same, which driving operation is accomplished, for example, through a circular gear or annular rack 12 engaged by a pinion 13 and driven from an electric motor 14. The latter may be supported on the top 10 of the furnace.

The present invention is concerned, however, with mechanism for obtaining an indication and/or record of the different intermittent angular movements of the said hopper 11. To this end, a horizontally disposed shaft 15 is designed to be rotated at a reduced velocity from the shaft of pinion 13, as through the universal joint 16 and worm 17 and worm wheel 18, which latter is secured on the said shaft 15.

An electromagnetic clutch, comprising the two halves 20 and 21, is arranged to transmit the motion of shaft 15 through a coaxial shaft 22 to an arm 23 secured to the shaft 22; and power for operating the clutch is transmitted thereto through the slip rings 24 and brushes 25 bearing thereon. The latter are included in a circuit 26 connected, for example, in parallel with the feeder circuit 27 of motor 14. Various types of clutches other than the particular arrangement herein shown may, of course, be substituted; and the manner of closing an energizing circuit may also be altered, as by contact made through one of the rotating members, without departing from the spirit of my invention.

However, as indicated, there is included in the circuit 26 a relay device 28, which is preferably of the delayed-opening type; and the same is designed to cause the clutch to operate whenever the motor is energized through its main 27 upon closing the switch 29.

The arm 23 is connected through an adjustable link 30 with the pointer arm 31 of an indicating instrument 32, said pointer arm having secured thereto a pointer member 33 movable thereby over the scale 34 which may be graduated, as shown, to indicate a deflection of 360° or complete rotation of the gear 12, that is to say, of hopper 11. In Fig. 3 a slight modification in the indicating arrangement is shown and whereby rotation of the top in either direction is indicated by the arm 31' which swings accordingly from a middle zero point of the scale 34' over graduations of 180' in opposite directions. The arm 31' is similarly connected through a link 30' to the arm 23', both arms in this embodiment, however, being initially located vertically instead of at an angle.

A spring 35, Fig. 2, is attached to the arm 23 and serves to retain the same normally against a stop 36 which corresponds to the zero position of the pointer 33; and a further stop 37 at the opposite end of its swing checks the outward movement of arm 23 in the event of more than a complete rotation of the hopper 11, whereby damage to the instrument 32 is prevented, as the clutch elements will slip in such contingency.

The indicating instrument 32 may be located in immediate proximity to the top as on the superstructure 38; and it is also generally desirable to have a record of the angular movements of the hopper, which records are usually provided for at a point remote therefrom.

To this end, movement of the pointer arm 33 may be electrically transmitted by any well-known method to a further pointer and recording arm 40 of an instrument 41 located at the desired point, the pointer being movable over a suitably graduated chart or strip 42 which is advanced by clock mechanism 43 in well-known manner. The records 44 of the different movements of the top will then appear substantially as indicated in Fig. 2 of the drawings, the particular records shown indicating that the top has rotated twice to 300°, then twice over 60°, then once over 240°, etc.

It will thus be noted that not only is an indication afforded, for example, at the charging apparatus itself but an actual record thereof may be had at a point remote therefrom. I do not wish to be restricted, however, to the particular scale arrangement shown which is best adapted to a charging head that rotates always in one direction, as the arrangement may be varied to suit different conditions.

A true history of the operations in the charging will thus be afforded; and where the charging head is a rotary top and has a tendency to coast after shutting down of its driving motor, it is preferred to have the relay 28 of the delayed-opening type to allow the measuring devices to also account for this coasting action. The relay, furthermore, is arranged to close instantly upon energization of the motor circuit; and a predetermined ratio between the rotation of pinion 13, that is to say, of charging head gear 12, and the shaft 22 is maintained.

Moreover, in the adjustment of arm 23 any ratio between the lengths of arms 23 and 31 may be secured. This adjustment is made by making the connection of arms 31 and 23 nearer to or further away from the pivotal center of arm 23. At the same time the adjustable link 30 is set so that the arm 23 is of proper length to give full scale deflection to arms 31 and 33. The two adjustments enable the apparatus to be adjusted in the field to any slightly varying gear ratios of the charging head gear 12 and its pinion 13.

If, as in the case in some charging heads, the rotation to any point is in both directions, the scale 34' of 180°–0–180°, Fig. 3, will be the better one. In such instances, the zero point on the scale is midway and the linkage is altered by having a spring 35' act so as to bring the mechanisms consisting of arms 23', 31' and 33' back to the vertical position and will in that case be suspended vertically above link 30' and attached to it as shown in Fig. 3.

I claim:

1. Measuring apparatus for rotary charging devices embodying a charging head, means to rotate the head intermittently over individual angular distances and including an electric motor and circuit, said apparatus comprising a relay energized from said motor circuit, a shaft driven from the head-rotating mechanism, and a second shaft adapted to be rotated therefrom, an electromagnetic clutch controlled by the said relay and adapted to connect said shafts, an arm oscillatable with the driven shaft, a measuring element connected with said arm to follow the movement thereof, and a spring connected with the said arm to restore the measuring element to normal position when the electromagnetic clutch is de-energized.

2. Apparatus for measuring individual angular displacements of a rotary element, comprising means for rotating said element intermittently, measuring means including an element for effecting a deflection with reference to a constant datum, means to restore the said element to said datum, and means intermediate the rotating means and the measuring means operable in opposition to the restoring means and only upon rotation of the rotary element, said means being adapted for automatically interrupting the driving of said measuring means upon cessation of the rotation of the rotating means whereby said element of the measuring means is permitted to return to the datum position, the extent of its deflections as effected by the rotating means serving as a measure of the individual angular movements of the rotary element.

3. Measuring apparatus for rotary charging devices embodying a charging head and means to rotate the same intermittently over individual angular distances, said apparatus comprising means driven from the charging device and having a measuring element for effecting a deflection with reference to a constant datum, said deflection being a function of the rotation as a measure of the respective individual angular movements of the charging head, means intermediate the rotating means and driven means to interrupt automatically the driving of the measuring element upon cessation of the rotation of the charging head, and means to restore then the measuring element to the datum position.

4. Measuring apparatus for rotary charging devices embodying a charging head with means to rotate the same intermittently over individual angular distances, said apparatus comprising electrically actuated controlling means, an instrument having a measuring element and driven from the head-rotating mechanism and including driving interrupting means controlled by the electrically actuated controlling means to interrupt automatically the driving of the measuring element upon cessation of rotation of the charging head, and means to restore then the measuring element to its initial position.

5. Measuring apparatus for rotary charging devices embodying a charging head, means to rotate the head intermittently over individual angular distances and including an electric motor and circuit, said apparatus comprising means energized from the said motor circuit, a measuring instrument having a measuring element driven from the head-rotating mechanism and including driving interrupting means controlled by the said means energized from the motor circuit to interrupt automatically the driving of the measuring element upon cessation of rotation of the charging head, and means to restore then the measuring element to its initial position.

6. Measuring apparatus for rotary charging devices embodying a charging head, means to rotate the head intermittently over individual angular distances and including an electric motor and circuit, said apparatus comprising a relay energized from said motor circuit, a measuring instrument having a measuring element driven from the head-rotating mechanism and including driving interrupting means controlled by the said relay to interrupt automatically the driving of the measuring element upon cessation of rotation of the charging head, and means to restore then the measuring element to its initial position.

7. Measuring apparatus for rotary charging devices embodying a charging head, means to rotate the head intermittently over individual angular distances and including an electric motor and circuit, said apparatus comprising a delayed-opening relay energized from said motor circuit, a measuring instrument having a measuring element driven from the head-rotating mechanism and including driving interrupting means controlled by the said relay to interrupt automatically the driving of the measuring element upon cessation of rotation of the charging head, and means to restore then the measuring element to its initial position.

8. Measuring apparatus for rotary charging devices embodying a charging head, means to rotate the head intermittently over individual angular distances and including an electric motor and circuit, said apparatus comprising a relay energized from said motor circuit, an angularly movable arm operated from the head-rotating mechanism and including driving interrupting means controlled by the said relay to interrupt automatically the driving of the angularly movable arm upon cessation of rotation of the charging head, a measuring element movable with said arm, and means to restore the measuring element to its initial position upon the deenergization of the relay.

9. Measuring apparatus for rotary charging devices embodying a charging head, means to rotate the head intermittently over individual angular distances and including an electric motor and circuit, said apparatus comprising a relay energized from said motor circuit, an angularly movable arm operated from the head-rotating mechanism and including driving interrupting means controlled by the said relay to interrupt automatically the driving of the angularly movable arm upon cessation of rotation of the charging head, a measuring element movable with said arm, means to restore the measuring element to its initial position upon the deenergization of the relay, and means to limit the outward swing of the said arm.

In testimony whereof I affix my signature.

LAURENCE G. BEAN.